Figure 1:
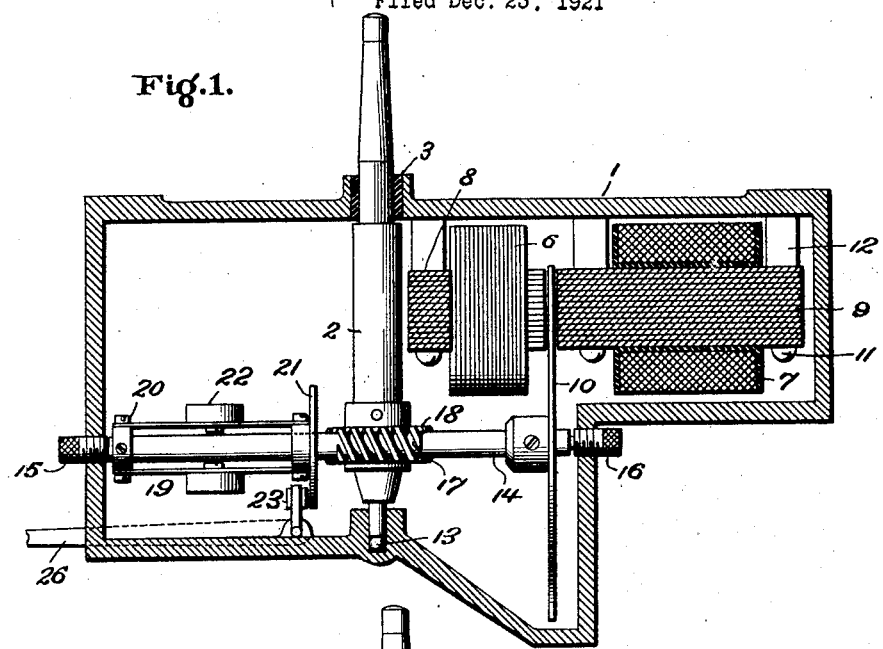

Jan. 29, 1924.

C. I. HALL 1,481,898

ELECTRIC DRIVE FOR SOUND REPRODUCING MACHINES

Filed Dec. 23, 1921

Inventor:
Chester I. Hall,
by Albert G. Davis
His Attorney,

Patented Jan. 29, 1924.

1,481,898

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

ELECTRIC DRIVE FOR SOUND-REPRODUCING MACHINES.

Application filed December 23, 1921. Serial No. 524,369.

*To all whom it may concern:*

Be it known that I, CHESTER I. HALL, a citizen of the United States, residing at Fort Wayne, in the county of Allen, State of Indiana, have invented certain new and useful Improvements in Electric Drives for Sound-Reproducing Machines, of which the following is a specification.

My invention relates to the driving mechanism of the disc type sound reproducing machine, and its object is to provide a novel form of electric drive for such a machine in which the parts are simple and compact. A further object of my invention is the application of a high speed motor to such a machine combined with a governing mechanism in such a way that the latter is driven directly by the motor whereby the speed control of the machine is very sensitive and accurate. The invention comprises certain other novel and improved features of general application to sound reproducing machines.

The novel features which I believe to be patentably characteristic of my invention are definitely indicated in the claims appended hereto. The construction and arrangement of the operating mechanism of my improved machine will be understood from the following description taken in connection with the accompanying drawings in which Fig. 1 is a sectional elevation through the casing containing the mechanical parts of my invention showing a worm drive between the motor and record spindle, and Fig. 2 is a similar view in which a spur gear drive is shown.

Referring now to the drawings, in which like parts are designated by like numerals, 1 indicates a casing containing the electric motor and the driving connection to the vertical spindle 2. The spindle 2 extends through a bearing 3 in the top of the case and is adapted to receive the usual disc record on its upper end above the casing, and its lower end is supported by a step bearing 13 in the wall of the casing 1. The casing will be held in the usual cabinet in any appropriate manner and bolt holes 4 and 5 are shown in Fig. 2 for this purpose. The electric motor used to drive the spindle 2 is shown partially in section and is of the induction type described in my U. S. Patent 1,240,711, September 18, 1917, assigned to the same assignee as the present invention, and comprises two exciting windings 6 and 7 displaced in phase relative to one another and wound on magnetic cores 8 and 9. The two cores are separated by a small air gap in which the movable disc 10 is rotatably mounted. The electromagnetic means including the magnetic core members and energizing coils produce a shifting magnetic field across the air gap between the core parts 8 and 9. The shifting magnetic field sets up induced currents in the conducting material of the disc rotor 10 and causes the same to rotate in a well understood manner. Since this type of motor is well known and its design constitutes no part of my invention, it will not be further explained. The stationary parts of the motor are held in position in the casing by means of bolts 11 and spacing bushings 12.

In Fig. 1 the disc-rotor 10 of the motor is mounted near one end of a horizontal shaft 14 rotatably mounted in adjustable bearing plugs 15 and 16. The central portion of this shaft carries a worm 17 cooperating with the worm gear 18 on the vertical spindle 2. The rotor 10, worm 17 and worm gear 18 are keyed or otherwise fastened to the shafts on which they are mounted whereby the motion of the motor is transmitted to the record spindle at a reduction in speed. The other end of shaft 14 carries an ordinary centrifugal governor 19. The governor is arranged concentric to shaft 14 and fastened thereto at 20. The other end of the governor carries a sliding collar 21 which slides back and forth on shaft 14 by reason of the centrifugal action of the weights 22. An adjustable friction pad 23 constituting a brake is provided adjacent the rotating collar 21 against which the latter is moved by the centrifugal action of the weights 22 to limit the speed of the revolving parts. The speed of the electric motor will be such that the brake 23 and collar 21 are in slight frictional contact when the speed of the record spindle is correct. Any tendency to increase the speed beyond this value will be instantly checked by an increased pressure between the pad 23 and collar 21. The normal speed at which the record spindle is driven may be varied by adjusting the position of the brake 23 toward or away from the collar 21 and to this end a brake lever 26 is brought out of the casing in a position to be conveniently adjusted from the top or side of the cabinet in which the casing is contained. The motor may also be momentarily stopped by means of this brake if desirable. It will be understood, however, that the usual switch will be provided in the electric circuit of the motor for starting and stopping purposes.

Figure 2:
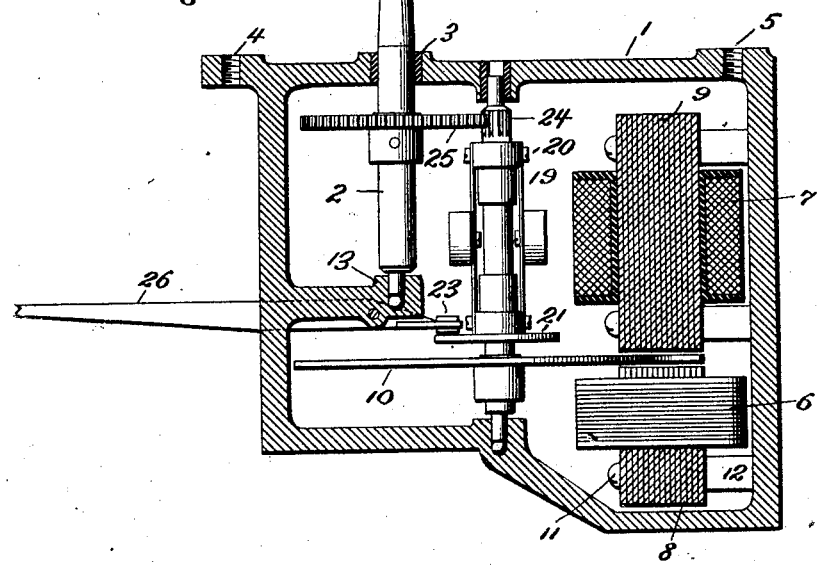

In Fig. 2 the high speed motor shaft is vertically mounted parallel to the record spindle 2 and the driving connection is made through spur gear 24 on the motor shaft and gear wheel 25 on the record spindle. The governor 19 is fastened to the motor shaft at 20 and has a sliding collar 21 cooperating with the brake 23 which may be adjusted to vary the speed by means of the lever 26. The arrangement of the governor between the spur gear 24 and motor disc 10 makes the arrangement slightly more compact than that shown in Fig. 1.

In both figures it will be noticed that the parts are nestled together into a very compact arrangement. The placing of the governor directly on the motor shaft and running it at a high speed makes a very steady smooth running machine and the dimensions of the parts and the space required therefor is materially less than in a machine where these parts are connected directly to the record spindle or to the disc upon which the record is supported. The single gear reduction may be accomplished by so-called noiseless gears which will make the machine very quiet in its operation. The parts are simple and rugged in their construction and the casing in which they are contained may be made practically dust-tight ensuring long life with minimum care. The casing and parts contained therein may thus be conveniently shipped and installed as a unit.

While the machine is particularly designed for driving phonographs, it is evident it may be used for other purposes where the requirements are of a similar nature.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. An electric drive for phonographs comprising a dust-proof casing, a vertical record spindle rotatably supported in said casing extending through a bearing in the top thereof, a drive shaft rotatably mounted in said casing parallel to said vertical spindle, reduction gearing between said shaft and spindle located near the top of said casing, an induction disc rotor on said shaft located near the bottom of said casing and extending beyond the lower end of said spindle and a field member for driving said disc supported in said casing on the opposite side of said shaft from said spindle.

2. An electric drive for phonographs comprising a dust-proof casing, a vertical record spindle extending through a bearing in the ceiling of said casing and having its lower end supported in a bearing mounted on a support extending from a side wall of said casing above the floor thereof, a vertical shaft geared to said spindle near the ceiling of said casing and extending to a bearing in the floor of said casing, an induction disc armature on said shaft between the floor of said casing and said support, and a field member for driving said disc mounted on the side wall of said casing opposite said support.

In witness whereof, I have hereunto set my hand this 17 day of Dec., 1921.

CHESTER I. HALL.